US008918850B2

(12) United States Patent
Lin et al.

(10) Patent No.: US 8,918,850 B2
(45) Date of Patent: *Dec. 23, 2014

(54) SHARE COOKIE ON NATIVE PLATFORM IN MOBILE DEVICE WITHOUT HAVING TO ASK FOR THE USER'S LOGIN INFORMATION

(75) Inventors: Jennifer W. Lin, San Jose, CA (US); Neha Pattan, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/195,550

(22) Filed: Aug. 1, 2011

(65) Prior Publication Data

US 2013/0036304 A1 Feb. 7, 2013

(51) Int. Cl.
*G06F 7/04* (2006.01)
*G06F 21/41* (2013.01)
*G06F 21/62* (2013.01)
*G06F 21/33* (2013.01)
*H04L 29/08* (2006.01)
*H04W 4/20* (2009.01)
*H04L 29/06* (2006.01)

(52) U.S. Cl.
CPC ............ *G06F 21/33* (2013.01); *H04L 63/168* (2013.01); *G06F 21/41* (2013.01); *G06F 21/6263* (2013.01); *G06F 2221/2129* (2013.01); *H04L 63/0414* (2013.01); *H04L 67/04* (2013.01); *H04L 63/0428* (2013.01); *G06F 2221/2119* (2013.01); *G06F 2221/2117* (2013.01); *H04W 4/206* (2013.01); *H04L 63/126* (2013.01); *H04L 67/22* (2013.01)
USPC ....................................... 726/7; 726/4; 726/5

(58) Field of Classification Search
CPC ...... G06F 21/33; G06F 21/41; G06F 21/6263; H04L 63/0414; H04L 63/0428; H04L 63/126; H04W 4/206
USPC ...................... 713/168; 726/2, 4–5, 7; 705/50
See application file for complete search history.

(56) References Cited

U.S. PATENT DOCUMENTS

| 5,898,681 | A | 4/1999 | Dutta |
| 6,954,799 | B2 * | 10/2005 | Lerner .......................... 709/240 |
| 7,299,364 | B2 | 11/2007 | Noble et al. |
| 7,545,768 | B2 | 6/2009 | Haverinen et al. |
| 7,617,233 | B2 | 11/2009 | Guido et al. |
| 7,647,628 | B2 | 1/2010 | Kebinger et al. |
| 7,685,298 | B2 | 3/2010 | Day et al. |
| 7,734,280 | B2 | 6/2010 | Eastlake, III |

(Continued)

OTHER PUBLICATIONS

Secure Cookies on the web, Joon S. Park and Ravi Sandhu, George Mason University, IEEE, Jul. Aug. 2000, pp. 36-44.

(Continued)

*Primary Examiner* — Samson Lemma
(74) *Attorney, Agent, or Firm* — Birch, Stewart, Kolasch & Birch, LLP

(57) ABSTRACT

Methods, apparatuses, and computer-readable media for obtaining a limited ID cookie for ad targeting are disclosed. A client requests a limited ID cookie from a cookie making module (CMM), which sends a personal cookie to a verification module for verification. After verification, verification module sends a user ID with user information to CMM. CMM creates the limited ID cookie, and the limited ID cookie is sent to the client. The limited ID cookie is sent to an ads server which utilizes the limited ID cookie to target ads towards the user.

19 Claims, 8 Drawing Sheets

(56) References Cited

U.S. PATENT DOCUMENTS

| | | | |
|---|---|---|---|
| 7,734,912 B2* | 6/2010 | Ganesan et al. | 713/155 |
| 7,865,613 B2* | 1/2011 | Lerner | 709/240 |
| 7,954,141 B2 | 5/2011 | De Lutiis et al. | |
| 7,996,320 B2* | 8/2011 | Bishop et al. | 705/50 |
| 2001/0054155 A1* | 12/2001 | Hagan et al. | 713/193 |
| 2002/0010776 A1 | 1/2002 | Lerner | |
| 2005/0198348 A1 | 9/2005 | Yeates et al. | |
| 2010/0043065 A1 | 2/2010 | Bray et al. | |
| 2010/0077469 A1 | 3/2010 | Furman et al. | |
| 2010/0100445 A1* | 4/2010 | Flood et al. | 705/14.64 |
| 2011/0099379 A1* | 4/2011 | Ganesan et al. | 713/175 |
| 2011/0126220 A1* | 5/2011 | Lerner | 719/328 |
| 2011/0314114 A1* | 12/2011 | Young et al. | 709/206 |

OTHER PUBLICATIONS

European Search Report dated Jan. 23, 2013 for Application No. 12178260.1.

* cited by examiner

LIMITED ID COOKIE
1) Encrypted Google ID for Google+ account
2) User Information (including user permission to use limited ID cookie for ad targeting)

REQUEST FOR LIMITED ID COOKIE
1) app ID

SHARE COOKIE ON NATIVE PLATFORM IN MOBILE DEVICE WITHOUT HAVING TO ASK FOR THE USER'S LOGIN INFORMATION

FIELD OF ENDEAVOR

Aspects of the present invention relate to methods, apparatuses, and computer-readable media to obtain a user identification cookie. Aspects of the invention are useful in a variety of applications, including the targeting of ads to users. Specifically, aspects of the present invention relate to obtaining information about the user to target ads at the user.

BACKGROUND

Applications, including Web browsers, on mobile devices may display advertising. For example, a game application may display advertising while a user is playing the game. Such advertising includes, for example, "Download free web auction software. Click here for details". Further, such advertisements may be targeted towards the user. For example, if the user enjoys gaming, an advertisement targeted to the user may include ad content such as "Try the new game Happy Birds". To enable such ad targeting, some information about the user must be made available to the application, so that the application may provide the user information to an ads server which serves the ads. However, such user information may not be readily available to the application because of application sandboxing.

As recognized by the inventors, since each application on a mobile device runs inside a sandbox, the application cannot access any cookies of the browser or other applications to obtain the user's information for ad targeting. In one approach, the applications must request permission from the user to access resources. In another approach, the users must login and authenticate themselves to receive targeted ads. However, such approaches are intrusive, inconvenient, and time-consuming, and may cause the user to switch to some other activity. In light of such drawbacks, more convenient and secure approaches to identifying the user are desired.

SUMMARY

In one aspect of the invention, the invention may include a method performed by a data processing apparatus, including: receiving, at a server, a personal cookie from a client executing an application that requires explicit permission to obtain a cookie containing a user ID, wherein an encrypted first data representing said user ID is included in said personal cookie, and said personal cookie may be used to obtain other cookies; decrypting said encrypted first data included in said personal cookie; extracting said user ID from said decrypted first data; verifying said user ID to be authentic; encrypting said user ID and including said encrypted user ID in a limited ID cookie; wherein said limited ID cookie is a cookie encrypted by said server, said limited ID cookie may be decrypted only by said server, and second data representing an encrypted form of said user ID is included in said limited ID cookie; and sending said limited ID cookie with said encrypted form of said user ID to said client.

In another aspect of the invention, the invention may include an apparatus including: a module for receiving, at a server, a personal cookie from a client executing an application that requires explicit permission to obtain a cookie containing a user ID, wherein an encrypted first data representing said user ID is included in said personal cookie, and said personal cookie may be used to obtain other cookies; decrypting said encrypted first data included in said personal cookie; a module for extracting said user ID from said decrypted first data; a module for verifying said user ID to be authentic; a module for encrypting said user ID and including said encrypted user ID in a limited ID cookie; wherein said limited ID cookie is a cookie encrypted by said server, said limited ID cookie may be decrypted only by said server, and second data representing an encrypted form of said user ID is included in said limited ID cookie; and a module for sending said limited ID cookie with said encrypted form of said user ID to said client.

In another aspect of the invention, the invention may include a system including: one or more computers; a computer-readable medium coupled to the one or more computers having instructions stored thereon which, when executed by the one or more computers, causes the one or more computers to perform operations including: receiving, at a server, a personal cookie from a client executing an application that requires explicit permission to obtain a cookie containing a user ID, wherein an encrypted first data representing said user ID is included in said personal cookie, and said personal cookie may be used to obtain other cookies; decrypting said encrypted first data included in said personal cookie; extracting said user ID from said decrypted first data; verifying said user ID to be authentic; encrypting said user ID and including said encrypted user ID in a limited ID cookie; wherein said limited ID cookie is a cookie encrypted by said server, said limited ID cookie may be decrypted only by said server, and second data representing an encrypted form of said user ID is included in said limited ID cookie; and sending said limited ID cookie with said encrypted form of said user ID to said client.

In another aspect of the invention, the invention may include a computer-readable medium encoded with a computer program including instructions that, when executed, operate to cause a computer to perform operations including: receiving, at a server, a personal cookie from a client executing an application that requires explicit permission to obtain a cookie containing a user ID, wherein an encrypted first data representing said user ID is included in said personal cookie, and said personal cookie may be used to obtain other cookies; decrypting said encrypted first data included in said personal cookie; extracting said user ID from said decrypted first data; verifying said user ID to be authentic; encrypting said user ID and including said encrypted user ID in a limited ID cookie; wherein said limited ID cookie is a cookie encrypted by said server, said limited ID cookie may be decrypted only by said server, and second data representing an encrypted form of said user ID is included in said limited ID cookie; and sending said limited ID cookie with said encrypted form of said user ID to said client.

In another aspect of the invention, the invention may include a method performed by a data processing apparatus, including: receiving, at a server, a token and a request for a limited ID cookie from a client executing an application that requires explicit permission to obtain a cookie containing a user ID, extracting said user ID from said token; encrypting said user ID and including said encrypted user ID in said limited ID cookie; wherein said limited ID cookie is a cookie encrypted by said server, said limited ID cookie may be decrypted only by said server, and second data representing an encrypted form of said user ID is included in said limited ID cookie; and sending said limited ID cookie with said encrypted form of said user ID to said client.

Further scope of applicability of the methods, apparatuses, and computer-readable storage mediums discussed will become apparent from the detailed description given hereinafter. However, it should be understood that the detailed description and specific examples, while indicating embodiments, are given by way of illustration only, since various changes and modifications within the spirit and scope of the concepts disclosed herein will become apparent to those skilled in the art from this detailed description.

BRIEF DESCRIPTION OF THE DRAWINGS

The systems and methods discussed will become more fully understood from the detailed description given herein below and the accompanying drawings which are given by way of illustration only, and thus are not limitative, and wherein.

The drawings will be described in detail in the course of the detailed description.

DETAILED DESCRIPTION

The following detailed description refers to the accompanying drawings. The same reference numbers in different drawings identify the same or similar elements. Also, the following detailed description does not limit the concepts discussed. Instead, the scope of the concepts discussed herein is defined by the appended claims and equivalents thereof.

Structure Overview

Advertisements displayed to users may be targeted to the users. For example, the ad targeting may include social ad targeting. The ad targeting may also be based on the user's interests, past behavior or other data collected for the user, or other ad targeting techniques. In particular, the ad targeting may be implemented on mobile devices. One system designed for ad targeting on mobile devices is the ad targeting system depicted in FIG. 1.

Figure 1:
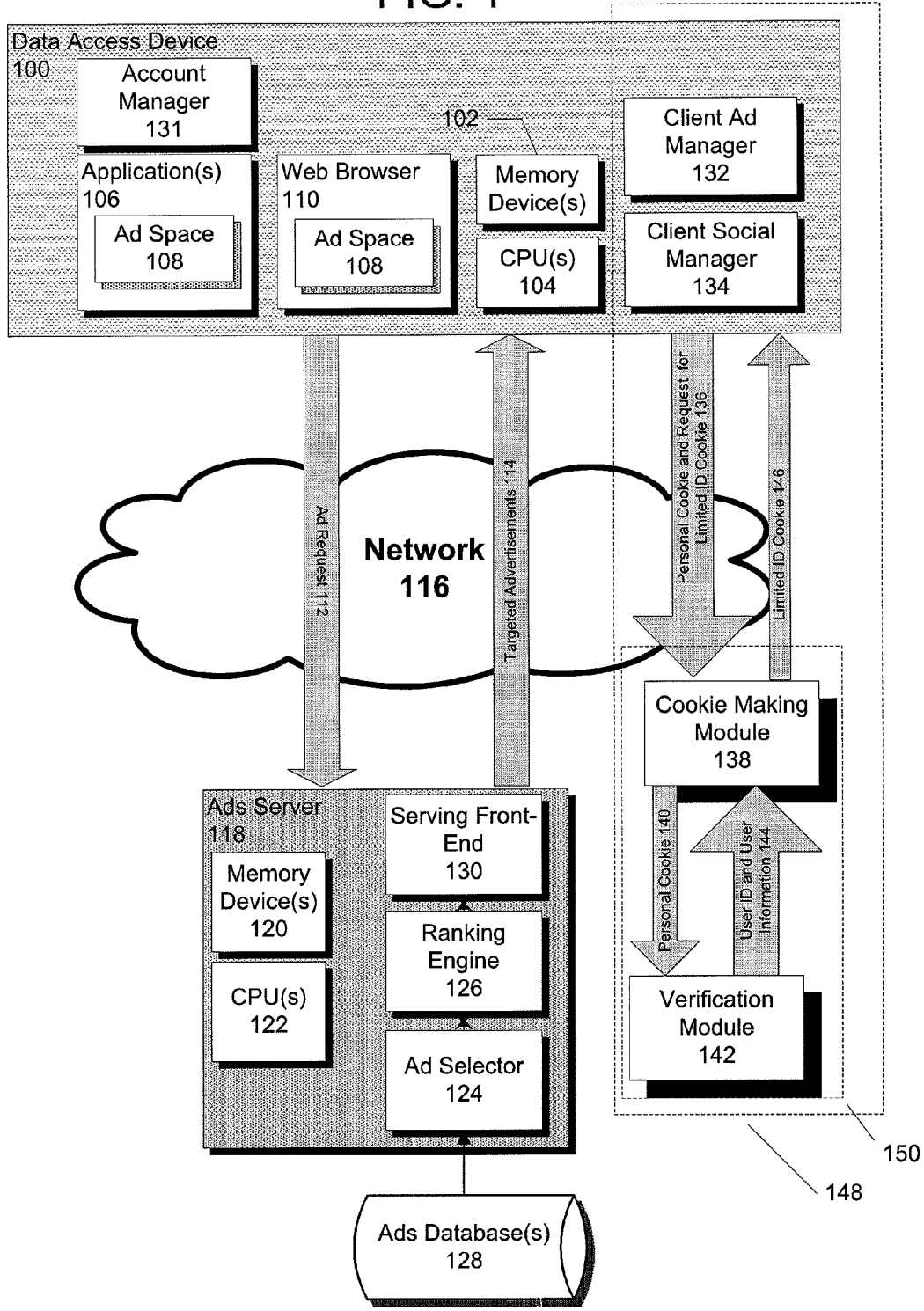
FIG. 1 is a block diagram illustrating an ad targeting system where a limited identification cookie for a user is shared with a mobile application, according to an embodiment.

FIG. 1 is a block diagram illustrating an ad targeting system where a limited identification cookie for a user (also referred to as "limited ID cookie") is shared with a mobile application, according to an embodiment. The terms "identification" and "ID" are interchangeable as used in the present patent specification.

An embodiment of a mobile data access device 100 may include a mobile telephone, a mobile handheld device, a media tablet device, netbook, notebook computer, GPS device, media player device, or some combination thereof or variation thereof. Mobile data access device 100 is hereafter referred to as "client" 100.

The client 100 may include one or more memory devices 102 for storing applications, application data, webpages, images, audio and/or video, device settings and/or preferences, and other information relevant to the operation, use, and potential user(s) of the device. A client 100 may also include one or more processors 104 to process the information and execute the applications stored in the memory device(s) 102. Variations of memory 102 and processor 104 devices may include magnetic, electronic, and/or optical devices and/or combinations thereof.

Some variations of a client 100 may include a display screen (not shown) and/or a speaker (not shown). Other variations of a client may include signal output paths such as wired or wireless connections to external audio and/or video devices such as docking stations, earphones, near field communication devices, external displays, and other similar information presentation devices.

A client 100 may include one or more applications 106. Some variations of applications 106 may include designated ad space 108 for the display of advertisements related to an application or the content/information presented or processed therein. A client 100 may also include one or more web browser tools 110 for viewing and interacting with webpages via a wired or wireless internet connection and/or via a mobile data exchange connection such as cellular, optical, near field communication, or some combination thereof. Some variations of a web browser 110 may also include a designated ad space 108 for the display of advertisements related to webpage content, search results, web-based email, map information, and/or geo-temporal factors.

The client 100 may submit advertisement requests 112 and receive served advertisements 114 via a communication network 116 such as the internet, a public, private, wired, and/or wireless local area network (LAN) or wide area network (WAN), a cellular communication network, telephone lines, radio-frequency networks, hard-wired connections, and/or combinations thereof. The ad requests 112 and served ads 114 may go to and from an ads server 118. An embodiment of an ads server 118 may be equipped with one or more memory devices 120 for storing information and one or more processors 122 for performing data processing operations. The embodiment shown is also equipped with an ad selector 124 and an optional ranking engine 126 that selects and optionally ranks ads from an ads database 128, and a serving frontend 130 that delivers the advertisement via network 116 to client 100. The embodiment also includes an account manager 131 that provides a centralized registry of the user's online accounts, and can generate authentication tokens for applications. In an embodiment, the ad targeting system depicted in FIG. 1 includes an ad targeting subsystem 148, the ad targeting subsystem 148 including client modules client ad manager 132 and client social manager 134, and server modules cookie making module (CMM) 138 and verification module 142. In some embodiments, CMM 138 and verification module 142 are part of a server 150.

Ad Targeting Subsystem

In an embodiment, ad targeting subsystem 148 includes client modules client ad manager 132 and client social manager 134, which are located on client 100. Although the client ad manager 132 is depicted in FIG. 1 as a logically separate unit, the client ad manager 132 may be compiled with the application 106 and become embedded within application 106. Client ad manager 132 thus may form an integral part of application 106. The client ad manager 132 manages advertising for application(s) 106, including sending requests for advertisements to ads server 118 and receiving ads from ads server 118. In some embodiments, web browser 110 may request ads directly from ad server 118.

Client social manager 134 is client software. Client social manager 134 manages the user's personal cookie 140 and data regarding the user's accounts, including a social networking account. An example of personal cookie 140 is a social networking service cookie. A social networking account is unique to the user, and represents the user for purposes of the user interacting with ads server 108 and ad targeting subsystem 148, and for social networking. Client social manager 134 may access the user's personal cookie 140, gaining access to information regarding the user's accounts, when the user is logged into client 100.

In an embodiment, ad targeting subsystem 148 includes server modules CMM 138 and verification module 142. In an embodiment, verification module 142 performs decryption, verification, and extraction when a personal cookie is received, to provide a user ID and a user information. In an embodiment, only the verification module 142 has access to a key for decrypting personal cookies. Verification module 142 may retrieve the user ID from the personal cookie after decryption, and verification module 142 may search for the user ID in a table to verify that the user ID is authentic. Verification module 142 may obtain the user information from the table once the user ID is found. Such user information may include, for example, whether the user associated with the user ID has permitted the use of a limited ID cookie for ad targeting.

In an embodiment, CMM 138 receives personal cookies and interacts with verification module 142 to create limited ID cookies. For example, CMM 138 sends personal cookie 140 to verification module 142 and, upon receiving a verified user ID, encrypts the user ID to create a limited ID cookie. CMM 138 may include a timestamp on the limited ID cookie. For example, CMM 138 may set the timestamp such that the limited ID cookie expires after 2 weeks. In some embodiments, CMM 138 encrypts the limited ID cookie such that only server 150 may decrypt the limited ID cookie for ad targeting. In some embodiments, CMM 138 encrypts the limited ID cookie such that only verification module 142 of client 100 may decrypt the limited ID cookie for ad targeting.

In an embodiment, in response to a request for a limited ID cookie 146 from client ad manager 132, client social manager 134 may communicate with CMM 138 to request the limited ID cookie 146. The limited ID cookie 146 is a cookie, created by CMM 138, that contains an encrypted social networking ID from the user's social networking account. The limited ID cookie is weak because the limited ID cookie cannot be decrypted by other third party services or applications and can be used only for ad targeting. In some embodiments, the limited ID cookie 146 may also be used to keep track of user presence in social networks.

In an embodiment, a social networking ID (also referred to as "User ID") is a long integer numeric value that is representative of the user's social networking account. For example, the social networking ID may be 2343223432. Each account maps to a numeric value, and the social networking ID of the user is the numeric value of the user's social networking account. The numeric values are generated by an account server for the accounts at the time that each account is created. In some embodiments, the limited ID cookie 146 may also contain other encrypted IDs for other accounts. In response to receiving the user's personal cookie 140 with a request for limited ID cookie 146, CMM 138 may send the user's personal cookie 140 to verification module 142.

Verification module 142 decrypts the personal cookie 140, and, after verification, provides the user ID and the user information 144 to CMM 138. CMM 138 creates the limited ID cookie 146, and sends the limited ID cookie 146 to client 100, and client ad manager 132 receives the limited ID cookie 146. In some embodiments, CMM 138 and verification module 142 may be part of the ads server 118. In other embodiments, CMM 138 and verification module 142 are located on other machines.

Accessing Data Outside Sandbox Using Weak Cookies

With application sandboxing, each application executes in a separate sandbox on client 100. The sandbox may be a virtual machine. Executing within a sandbox, the application is not allowed to adversely affect other applications, the user, or the operating system. Each application executing in a sandbox must be explicitly granted permission in order for the application to access resources outside of the sandbox.

In an embodiment, by providing a limited ID cookie to client ad manager 132, ad targeting subsystem 148 may allow client ad manager 132 to receive targeted ads without allowing client ad manager 132 access to all of the user's personal information. Social networking ID information is included in the limited ID cookie. If an unauthorized party gains access to the limited ID cookie, the potential harm to the user is limited to ad targeting using the social networking ID. Thus, the server-side components CMM 138 and verification module 142 may process and make available user information to client ad manager 132 despite that application 106 and the embedded client ad manager 132 both execute within a sandbox.

With the embodiments described herein, information about the user in the form of the limited ID cookie 146 can be passed onto client ad manager 132 without inconvenience to the user. In turn, client ad manager 132 uses the user information to submit a request for a targeted ad from ads server 118. Ads server 118 provides the targeted ad to client ad manager 132, and the targeted ad is displayed in ad space 108.

Strong vs. Weak Cookies

In an embodiment, client social manager 134 has access to a "strong" cookie stored on the client, which is the personal cookie 140. A "personal cookie" is a cookie, stored on the client, that contains the user's identification information and contains user data that includes information about the user's social networking service login account. A cookie is "strong" if the contents of the cookie include more details about the user, and the cookie may be used to retrieve more privileged, more sensitive information about the user. Conversely, a cookie is "weak" if the contents of the cookie contain limited user information, and the weak cookie may be limited to retrieve only less privileged, less sensitive information about the user. The personal cookie 140 is a strong cookie, and client social manager 134 may use user's personal cookie 140 to obtain any other type of information regarding the user. For example, client social manager 134 may use personal cookie 140 to obtain weaker cookies for limited access to data.

One reason for using weaker cookies for limited tasks is that even if the weaker cookie is compromised, the weaker cookie will only allow limited information or access to the unauthorized party. The stronger cookie is protected more securely with encryption, and the weak cookie may be less protected since the risks associated with a compromised weak cookie are reduced. In an embodiment, limited ID cookie 146 is a weak cookie, with an encrypted social networking ID, that may only be used by one or more modules or applications for ad targeting. A social networking ID means the numeric representation of the user's social networking account.

Sharing a Limited ID Cookie

Figure 2:
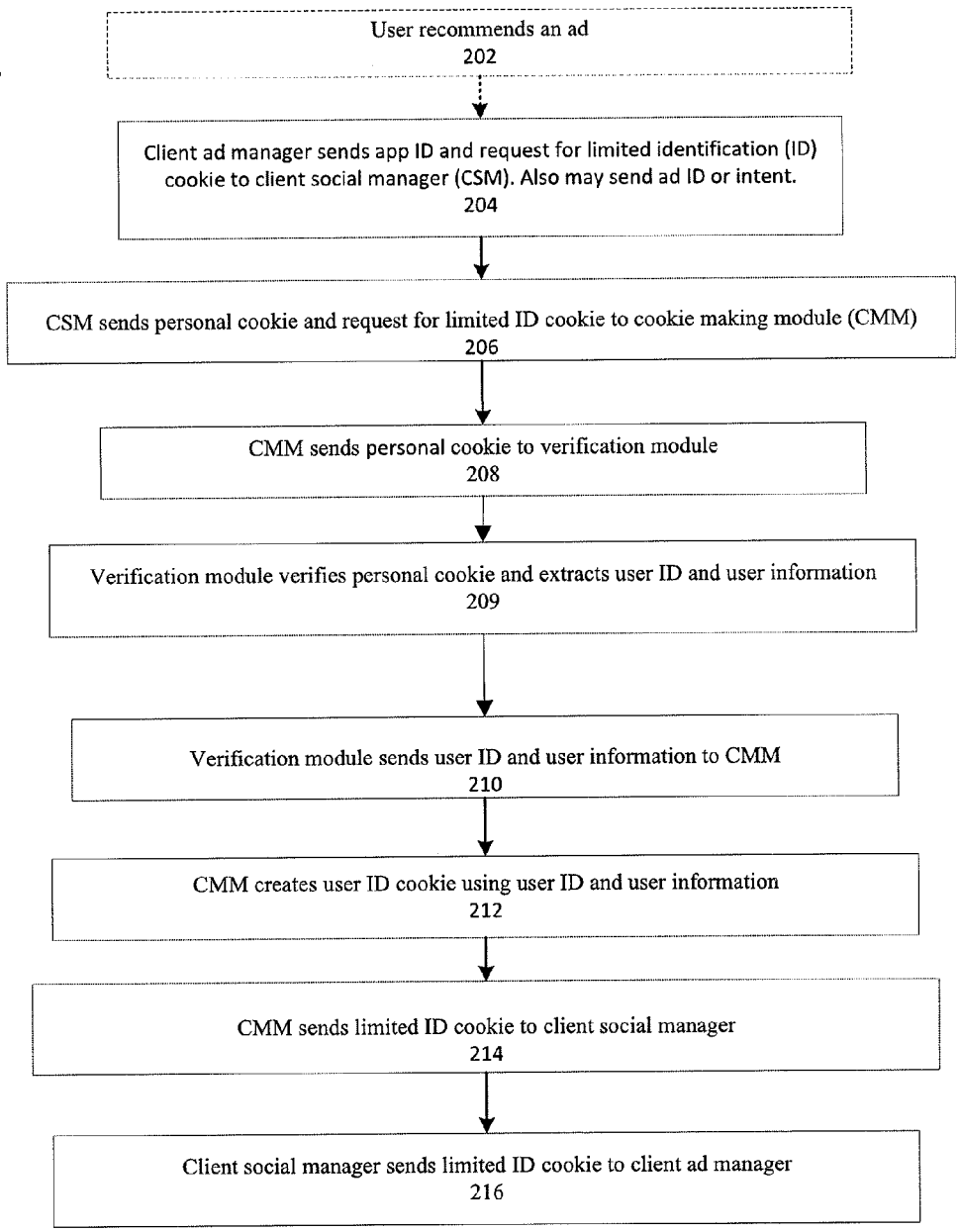
FIG. 2 is a flow diagram illustrating sharing a limited identification cookie with a mobile application, according to an embodiment.

FIG. 2 is a flow diagram illustrating sharing a limited ID cookie with a mobile application, according to an embodiment. The process depicted in FIG. 2 may be performed by the ad targeting subsystem 148 depicted in FIG. 1. In an embodiment, when application 106 initiates steps to display an advertisement by requesting that client ad manager 132 retrieve an ad, client ad manager 132 initially checks whether a limited ID cookie 146 is stored locally on the client. If the limited ID cookie 146 is stored locally, then client ad manager 132 sends both limited ID cookie 146 and a request for an advertisement to ads server 118. Ads server 118 then provides the ad to client ad manager 132 for display in ad space 108.

If the limited ID cookie 146 is not stored locally on the client, then client ad manager 132 may perform different steps depending on the process invocation capabilities allowed on the client 100. In some embodiments, as depicted in FIG. 2, as a first step 202, a user responds to some content of the ad. For example, the user responds to the ad by clicking on the ad. The interaction of the ad targeting subsystem 148 with the user's response to the ad may be different depending on the process invocation capabilities allowed on the platform of client 100.

In embodiments implemented on a platform where an application cannot invoke another application as a background process, step 202 may occur prior to step 204. In such embodiments, a context switch occurs when the user responds to an advertisement. The user confirms the response, and a limited ID cookie is retrieved during the time period while the user is confirming or afterwards. When an advertisement is requested by an application, the advertisement can be targeted and retrieved without asking for user consent or retrieving other identifying information of the user. In an embodiment, after the user confirms the response, the entire process of retrieving the limited ID cookie and targeted advertisement occurs in the background and is non-intrusive with respect to the user.

In some embodiments, ad targeting may be implemented on a platform that allows an application to invoke another application as a background process. Such a platform allows multiple application processes to run simultaneously while allowing background invocations of other applications. One or more applications can be invoked in the background while an invoking application runs in the foreground.

In embodiments implemented on a platform that allows applications to invoke other applications as background processes, step 202 need not occur prior to step 204 and, in such embodiments, step 202 may occur after the events in depicted FIG. 2.

In step 204, the client ad manager 132 sends an application ID (hereafter "app ID") and request for limited ID cookie 146 to the client social manager 134. Every application has an app ID. In embodiments that do not allow applications to invoke other applications as background processes, the client ad manager 132 may also send an ad ID to the client social manager. In embodiments allowing applications to invoke other applications as background processes, the client ad manager 132 may also send an "intent" to the client social manager. The intent is a mechanism to send a request for limited ID cookie 146. In an embodiment, the intent is a message that activates an activity or service. The intent may include an action to be taken and the data to act on. For example, the intent may include that application number 3 (e.g. a gaming application) seeks to obtain a limited ID cookie.

When the user is logged in, client social manager 134 has access to the personal cookie 140 which contains information regarding the user's accounts. Such information also includes data that indicates which account is the user's social networking account. In step 206, the client social manager sends the personal cookie 140 and request for limited ID cookie to CMM 138. For example, if application number 10 is requesting the limited ID cookie 146, and the user has 3 accounts, with the user logged into her social networking account (e.g. account number 3), client social manager 134 may send a request for the limited ID cookie 146. The limited ID cookie 146 includes the user's social networking ID for account number 3. The request is sent on behalf of application number 10. The app ID (e.g. application number 10) may also be sent with the request.

In step 208, CMM 138 sends the personal cookie 140 to verification module 142. In step 209, verification module 142 verifies that the personal cookie 140 is authentic, and extracts the user ID and user information from the personal cookie 140. In an embodiment, verification module 142 performs verification by decrypting the personal cookie to obtain the user ID, and then searching for the user ID in a table. The user information may be obtained from the table once the user ID is found. Such user information may include, for example, whether the user associated with the user ID has permitted the use of limited ID cookie 146 for ad targeting purposes. User ID is, for example, a unique long integer representation of the user's social networking account.

In step 210, verification module 142 sends the user ID and user information to CMM 138. In step 212, CMM 138 creates a limited ID cookie using the user ID and the user information.

Figure 6:
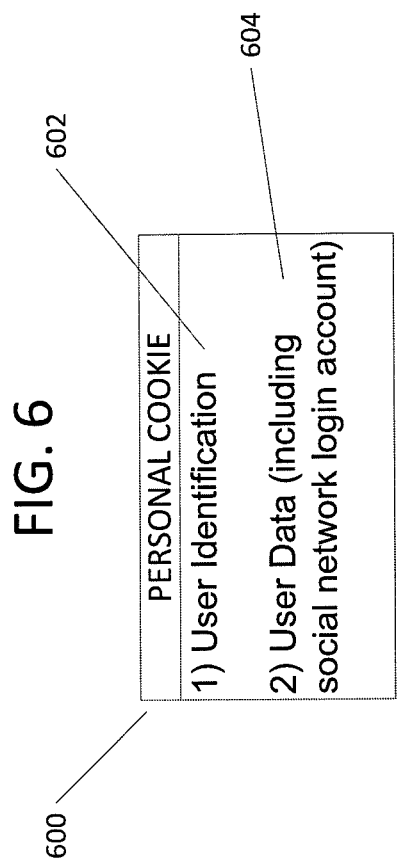
FIG. 6 illustrates an example personal cookie, according to an embodiment.

In an embodiment, the format of limited ID cookie is as depicted in FIG. 6. In step 214, CMM 138 sends limited ID cookie to client social manager. In step 216, client social manager sends the limited ID cookie to client ad manager 132. Client ad manager 132 then sends the limited ID cookie to ads server 118 for creation of a targeted ad (not depicted). Ads server reads the user ID and user information by sending the encrypted limited ID cookie to verification module 142 for decryption. Ads server 118 may select one or more ads based on the user ID. For example, a selected ad may be similar to ad content that reads "View the best restaurants near Mountain View", where Mountain View is where the user lives. In another example, the targeted advertisement may be for products similar to those that the user or the user's friends are known to have enjoyed in the past, or for restaurants that have been visited by the user or the user's friends.

In some embodiments, client social manager 134 or CMM 138 may check that the app ID is a valid app ID associated with an application that is allowed to receive the limited ID cookie, prior to sending the limited ID cookie to the application. For example, the app ID may belong to a known malicious application, and the limited ID cookie is therefore denied to the application. In some embodiments, when a user reports that an application is behaving maliciously, client social manager 134 stores the app ID of the malicious application in a table. Client social manager 134 does not grant the limited ID cookie 146 to any application with an app ID listed in the table. In some embodiments, users may revoke the right of an application to acquire a limited ID.

In an embodiment, the limited ID cookie 146 has a limited lifetime, and becomes ineffective after expiration. Upon expiration of the lifetime of limited ID cookie 146, client ad manager 132 requests a new limited ID cookie.

Figure 3:
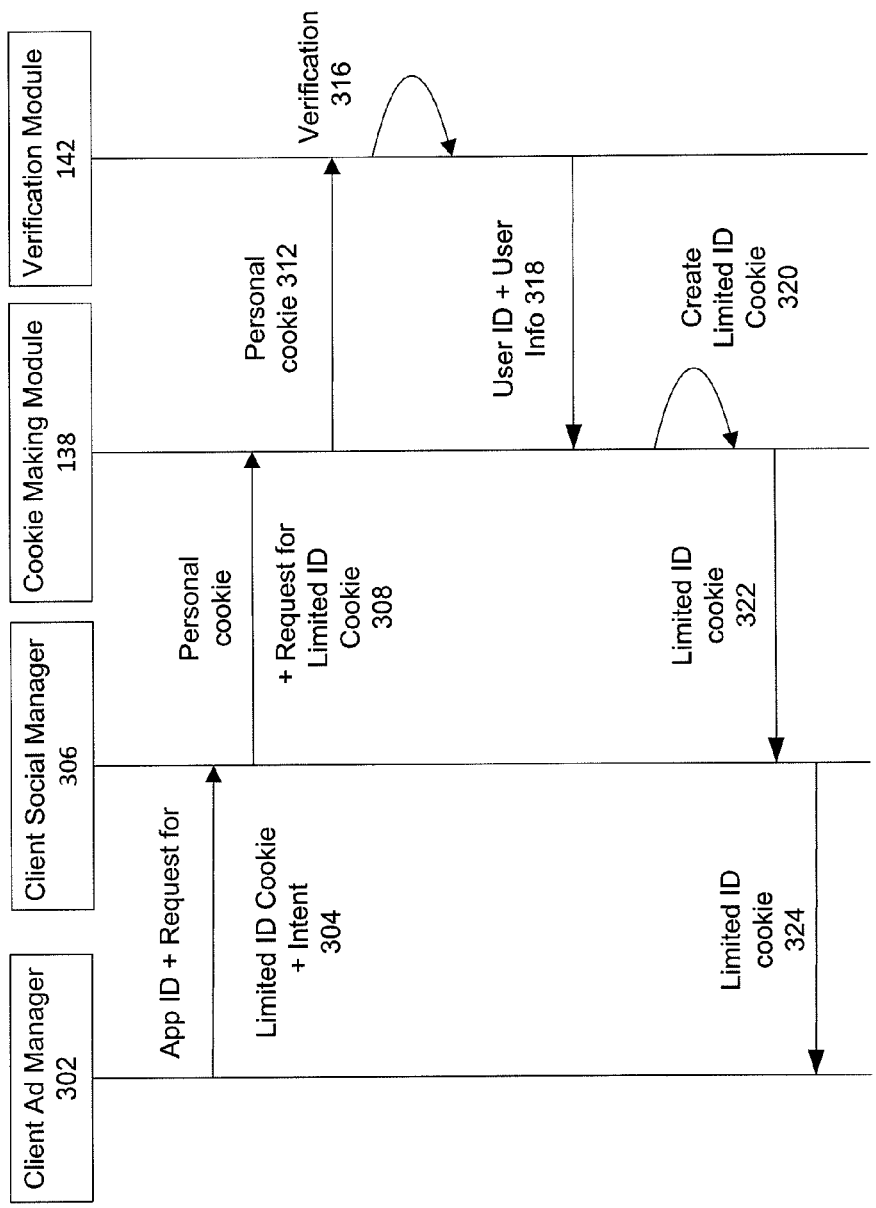
FIG. 3 is a diagram illustrating communications for sharing a limited ID cookie with a mobile application on a platform that allows an application to invoke other applications as background processes, according to an embodiment.

Sharing a Limited ID Cookie on a Platform That Allows an Application to Invoke Other Applications as Background Processes FIG. 3 is a diagram illustrating communications for sharing a limited ID cookie with a mobile application on a platform that allows an application to invoke other applications as background processes, according to an embodiment. The process depicted in FIG. 3 may be performed by ad targeting subsystem 148 of FIG. 1. Ad targeting subsystem 148 may perform the steps depicted in FIG. 3 as a background process. By staying in the background, client ad manager 302 can obtain the limited ID cookie non-intrusively, with minimal inconvenience to the user. In such embodiments, the user may not be aware that ad targeting subsystem 148 is performing the process depicted in FIG. 3 in the background.

As depicted in FIG. 3, client ad manager 302 sends an app ID, request for limited ID cookie, and intent in message 304 to client social manager 306. In response, client social manager 306 retrieves the personal cookie 140 belonging to the user from a storage (e.g. data storage 750 of FIG. 7) located on the client, and sends the personal cookie 140 and request for limited ID cookie in message 308 to CMM 138. Since, in an embodiment, there is only one user per client, there is one personal cookie 140 for client social manager 306 to retrieve and send.

CMM 138 sends the personal cookie 140 to verification module 142 in message 312. After decrypting the personal cookie 140 of message 312, verification module 142 verifies the authenticity of the user ID in the personal cookie. The user ID is the numeric value representation of the user's social networking account. In an embodiment, verification module extracts the user ID from the personal cookie of message 312 and performs a search in a table for the user ID. In some embodiments, verification module 142 searches a table for user information indicating whether the user associated with the user ID has permitted the use of personal cookie 140 for ad targeting. If user ID is authentic, verification module 142 sends the user ID and user information data to CMM 138 in message 318.

In step 320, CMM 138 creates the limited ID cookie using the user ID and user information received from verification module 142. CMM 138 encrypts the user ID and user information and includes the encrypted user ID and user information in limited ID cookie 146. CMM 138 sends limited ID cookie 146 in message 322 to client social manager 306. Client social manager 306 sends limited ID cookie in message 324 to client ad manager 302.

After client ad manager 302 receives the limited ID cookie, the limited ID cookie is sent to ads server 118 to provide a targeted advertisement to the user. Ads server 118 may select advertisements for ad targeting using the user ID. For example, based on the user ID available from the limited ID cookie for the user, the targeted advertisement may be for products similar to those that the user or the user's friends are known to have enjoyed in the past, or for restaurants that have been visited by the user or the user's friends.

Figure 4:
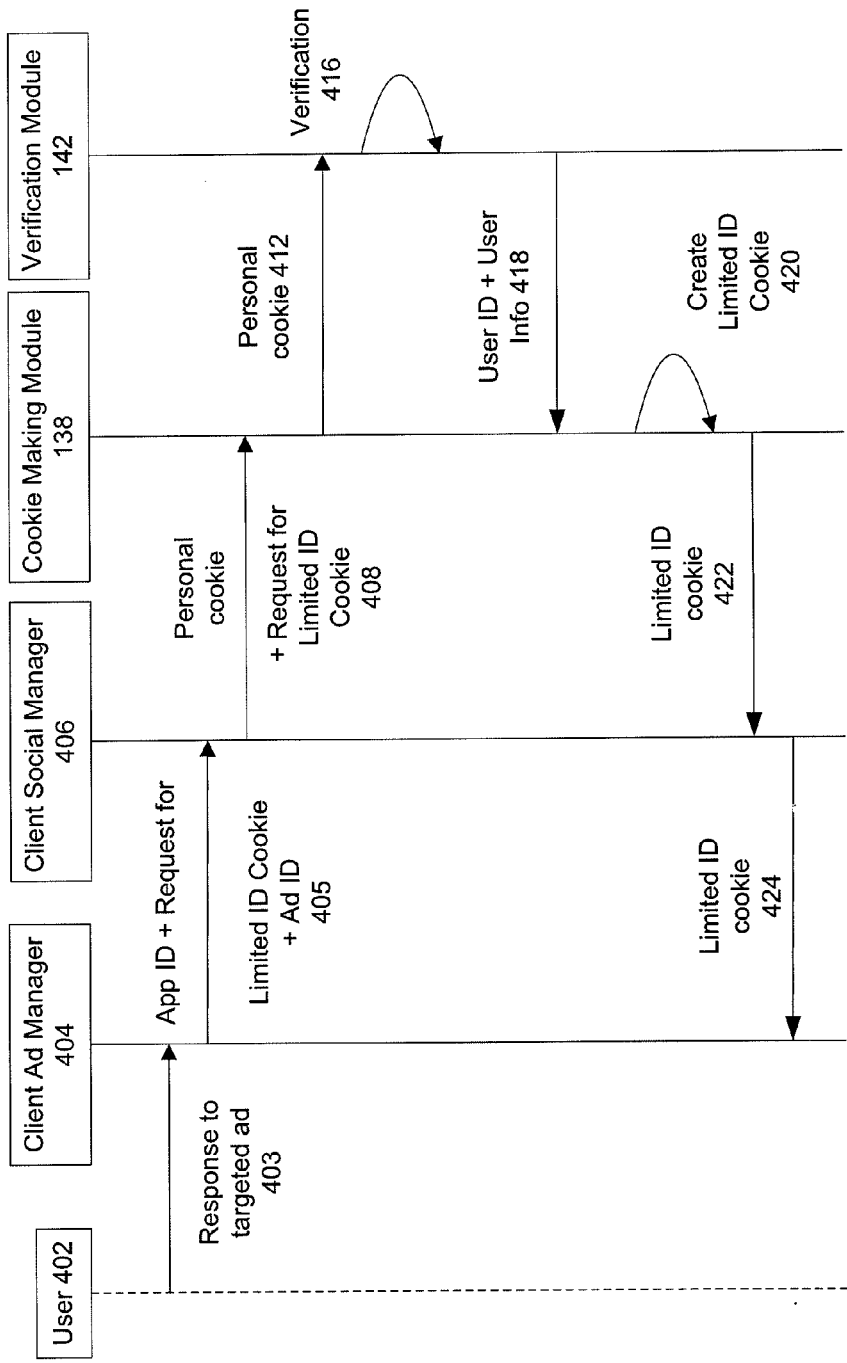
FIG. 4 is a diagram illustrating communications for sharing a limited ID cookie with a mobile application on a platform that does not allow an application to invoke other applications as background processes, according to an embodiment.

Sharing a Limited ID Cookie on a Platform That Does Not Allow an Application to Invoke Other Applications as Background Processes FIG. 4 is a diagram illustrating communications for sharing a limited ID cookie with a mobile application on a platform that does not allow an application to invoke other applications as background processes, according to an embodiment. The process depicted in FIG. 4 may be performed by ad targeting subsystem 148 of FIG. 1.

In an embodiment, as depicted in FIG. 4, a user 402 responds to a targeted ad and the response is received in step 403. The user response triggers client ad manager 404 to send a message 405 with an app ID, ad ID, and a request for a limited ID cookie. User 402 receives a request (not depicted) for confirmation from client ad manager 404 to confirm that user 402 wants to interact with the advertisement that user 402 has clicked on. At approximately the same time, client social manager 404 becomes an active process. By not requesting the limited ID cookie until user 402 has interacted with an ad, client ad manager 404 avoids intrusively disturbing user 402, since client social manager 132 does not become an active process and appear in the foreground. After receiving an indication that user 402 has interacted with the ad, client ad manager 404 sends message 405 to client social manager 406. Client social manager 406 sends the personal cookie 140 and request for limited ID cookie in message 408 to CMM 138.

CMM 138 sends the personal cookie 140 to verification module 142 in message 412. After decrypting the personal cookie 140 of message 412, verification module 142 verifies the authenticity of the user ID in the personal cookie. The user ID is the numeric value representation of the user's social networking account. In an embodiment, verification module extracts the user ID from the personal cookie of message 412 and performs a search in a table for the user ID. In some embodiments, verification module 142 searches a table for user information indicating whether the user associated with the user ID has permitted the use of personal cookie 140 for ad targeting. If user ID is authentic, verification module 142 sends the user ID and user information data to CMM 138 in message 418.

In step 420, CMM 138 creates the limited ID cookie using the user ID and user information received from verification module 142. CMM 138 encrypts the user ID and user information and includes the encrypted user ID and user information in limited ID cookie 146. CMM 138 sends limited ID cookie 146 in message 422 to client social manager 406. Client social manager 406 sends limited ID cookie in message 424 to client ad manager 404.

After client ad manager 404 receives the limited ID cookie, the limited ID cookie is sent to ads server 118 to provide a targeted advertisement to the user. Ads server 118 may select advertisements for ad targeting using the user ID. For example, based on the user ID available from the limited ID cookie for the user, the targeted advertisement may be for products similar to those that the user or the user's friends are known to have enjoyed in the past, or for restaurants that have been visited by the user or the user's friends.

Token-Based Sharing of a Limited ID Cookie

Figure 5:
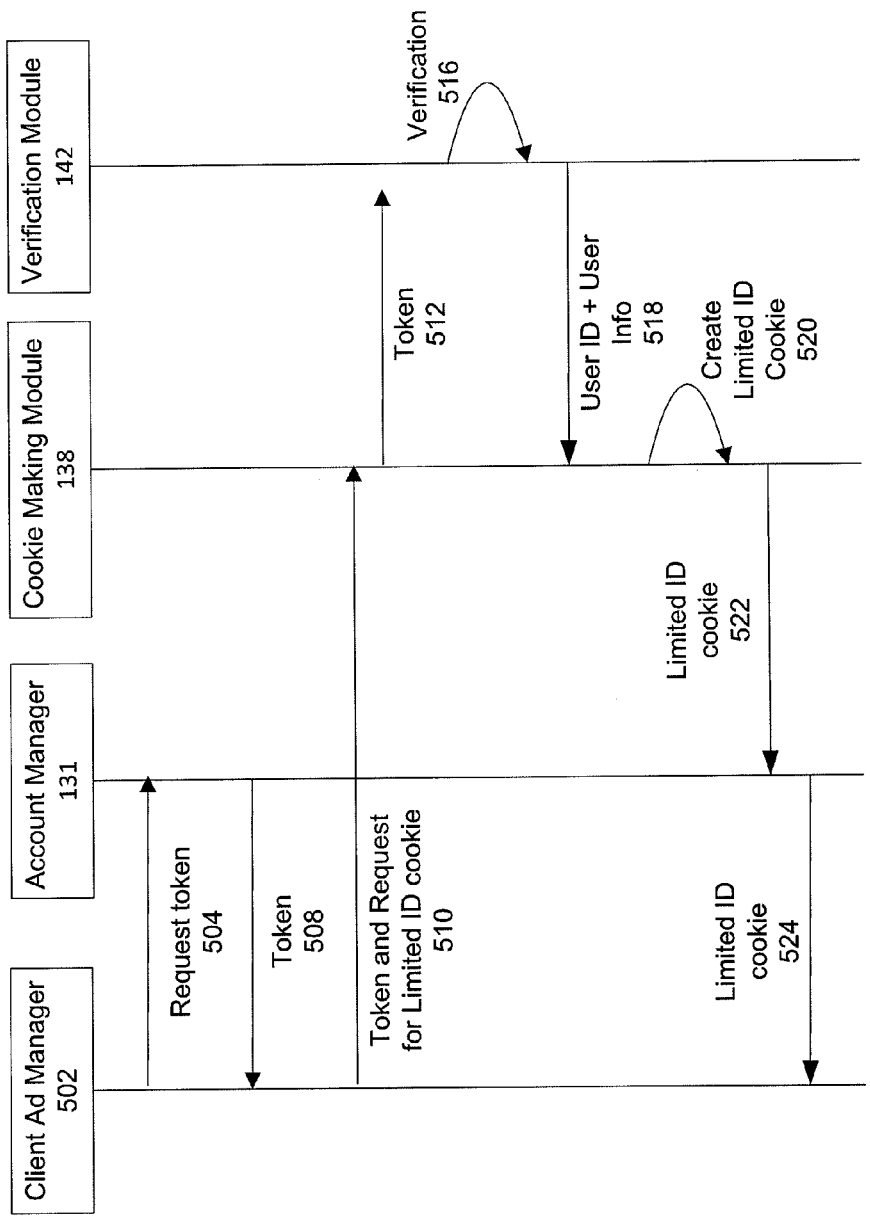
FIG. 5 is a diagram illustrating communications for sharing a limited ID cookie with a mobile application using an authentication token, according to an embodiment.

FIG. 5 is a diagram illustrating communications for sharing a limited ID cookie with a mobile application using an authentication token, according to an embodiment. The authentication token (hereafter "token") may be issued by account manager 131. Account manager 131 provides a centralized registry of the user's online accounts, and can retrieve authentication tokens for applications. The token is initially retrieved by account manager 131 when client ad manager 502 requests a token by sending a request for a token. Account manager 131 may retrieve the token from a token server using the user's credentials. In some embodiments, the token server may be verification module 142. The credentials may be, for example, a username and password. Servers, such as CMM 138, may support the use of tokens. In some embodiments, tokens may be limited by scope. For example, a scope of a token may be token_for_getting_limited_ID_cookie. That is, in an embodiment, the example token is only effective for retrieving a limited ID cookie. Thus, tokens may be used to authenticate a request to the CMM 138 server without sending the user's actual password. The tokens have a limited lifetime and are refreshed periodically.

The process depicted in FIG. 5 may be performed by account manager 131 of FIG. 1 with client ad manager 132, CMM 138, and verification module 142 of ad targeting subsystem 148. Client ad manager 502 of FIG. 5 is an example of client ad manager 132 of FIG. 1. The steps depicted in FIG. 5 may be performed as a background process. When the steps depicted in FIG. 5 are performed in the background, client ad manager 502 can obtain the limited ID cookie non-intrusively, with minimal inconvenience to the user. In such embodiments, the user may not be aware that the steps depicted in FIG. 5 are performed in the background.

As depicted in FIG. 5, client ad manager 502 sends a request for a token in message 504 to account manager 131. In response, account manager 131 retrieves the token from the token server using the user's credentials, and sends the token in message 508 to client ad manager 502. In some embodiments, consent from the user is not necessary for the granting of the token for an application if the token server is set to auto-approve such tokens. Client ad manager 502 sends the token along with a request for a limited ID cookie in message 510 to CMM 138. CMM 138 sends the token in message 512 to verification module 142. In some embodiments, account manager 131 sends the request for the limited ID cookie along with the token directly to CMM 138.

In some embodiments, after verification module 142 receives the token, verification module 142 extracts the user ID from the token and verifies the user ID by searching for the user ID in a table. Verification module 142 may also search for user information associated with the token in a table. The user information may indicate whether the user associated with the user ID has permitted the use of the limited ID cookie for ad targeting. After verifying the user ID, verification module 142 sends the user ID and user information to CMM 138 in message 518.

In step 520, CMM 138 creates the limited ID cookie using the user ID and user information received from verification module 142. CMM 138 encrypts the user ID and user information and includes the encrypted user ID and user information in limited ID cookie 146. CMM 138 sends limited ID cookie 146 in message 522 to account manager 131. Account manager 131 sends limited ID cookie in message 524 to client ad manager 502.

After client ad manager 502 receives the limited ID cookie, the limited ID cookie is sent to ads server 118 to provide a targeted advertisement to the user. Ads server 118 may select advertisements for ad targeting using the user ID. For example, based on the user ID available from the limited ID cookie for the user, the targeted advertisement may be for products similar to those that the user or the user's friends are known to have enjoyed in the past, or for restaurants that have been visited by the user or the user's friends.

Personal Cookie

FIG. 6 illustrates an example personal cookie, according to an embodiment. One example of the personal cookie is the social networking service cookie. A personal cookie 600 includes data that indicates a user identification 602 and user data 604. Personal cookie 600 is an example of personal cookie 140 from FIG. 1.

In an embodiment, user data 604 includes data about the user's social networking service login account for the ad targeting system. In an embodiment, each of the user's accounts is mapped to a unique numeric value which is a long integer type. For example, "johndoe@gmail.com" maps to a unique numeric value of 43223423432. If "johndoe@gmail.com" is the social networking account of John Doe, then 43223423432 is the social networking ID for John Doe. Thus, the user data stored in the personal cookie includes the social networking ID of 43223423432.

In some embodiments, the personal cookie may be decrypted only by server 150. In some embodiments, the personal cookie may be decrypted only by verification module 142 of server 150. In some embodiments, the client sends the personal cookie to server 150 for decryption. Verification module 142 may store and utilize a private key that is used for decryption of the personal cookie.

In some embodiments, server 150 stores and utilizes symmetric keys to securely communicate information such as user ID with the client and with the ad server. The keys may be kept secret and rotated every month. The key on the client side is the key with which an application developer signs his certificate. This key may be used by an operating system to retrieve the app ID. On the ad server, the ad server has ssh keys that are used to define permissions on the ad server. A LDAP user (or group) associated with the ad server is granted privileges, such as ask verification module for user ID, that are enforced with the keys.

The personal cookie is stored with the mobile device. The personal cookie may be stored for a duration of time within the mobile device, until conditions require the expiration of the personal cookie.

Limited ID Cookie & Request for Limited ID Cookie

Figure 7A:
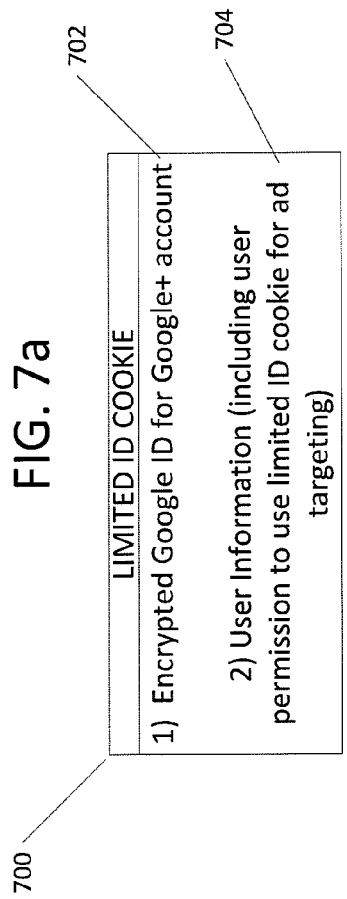
FIG. 7a illustrates an example user cookie, according to an embodiment.

FIG. 7a illustrates an example limited ID cookie, according to an embodiment. A limited ID cookie 700 includes data that indicates a unique encrypted social networking ID 702 for the user's social networking account. Limited ID cookie 700 is an example of the limited ID cookie 146 from FIG. 1. The limited ID cookie 700 is weak because there is limited use for the limited ID cookie 700. In an embodiment, the social networking ID that is encrypted within the limited ID cookie is a long integer that uniquely represents the user's social networking account. In some embodiments, in case the security of the limited ID cookie 700 is compromised, the limited ID cookie 700 can be used only for ad targeting. Thus, the online security of the user's identification is afforded an additional measure of protection.

In some embodiments, the limited ID cookie may also include other data, such as user information 704, which indicates that a user associated with the user ID has permitted the use of the limited ID cookie for ad targeting. In some embodiments, other encrypted IDs for other accounts may also be stored with the limited ID cookie 700. In some embodiments, the limited ID cookie may also be used to keep track of user presence in social networks.

In some embodiments, only server 150 may decrypt the limited ID cookie. In some embodiments, only verification module 142 of server 150 may decrypt the limited ID cookie. In some embodiments, the ads server sends the limited ID cookie to verification module 142 of server 150 for decryption. Verification module 142 may store and utilize a private key that is used for decryption of the limited ID cookie. In some embodiments, CMM 138 may store and utilize a public key of verification module 142 for encrypting the limited ID cookie. In some embodiments, verification module 142 and CMM may both use the same symmetric key for encryption and decryption.

The limited ID cookie may include a timestamp. For example, CMM 138 may set the timestamp such that the limited ID cookie expires after 2 weeks. In some embodiments, CMM 138 encrypts the limited ID cookie such that only client ad manager 132 may decrypt the limited ID cookie.

Figure 7B:
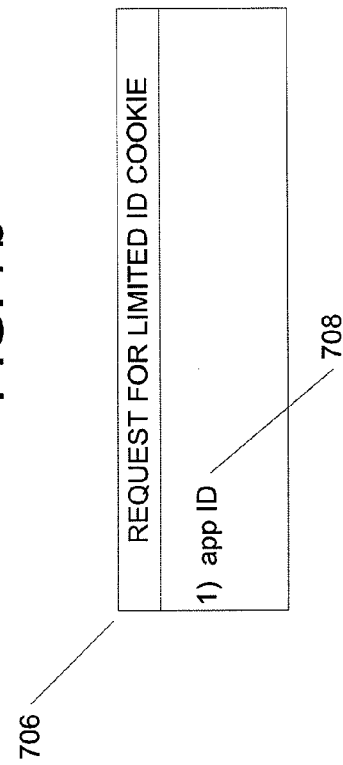
FIG. 7b illustrates an example request for a limited ID cookie, according to an embodiment.

FIG. 7b illustrates an example request for a limited ID cookie, according to an embodiment. The request for the limited ID cookie 706 includes the app ID 708 of the application 106 that requests the limited ID cookie 146. The app ID may be used to check whether application 106 is a malicious application.

Out-In/Opt-Out

In some embodiments, users may opt-in or opt-out of receiving targeted advertisement. If a user decides that she does not want to receive targeted advertising, then her social networking ID would not be used for targeted advertising. In some embodiments, ad targeting subsystem 148 does not receive the limited ID cookie for a user that has opted out of receiving targeted advertising.

EXAMPLE EMBODIMENTS

Figure 8:
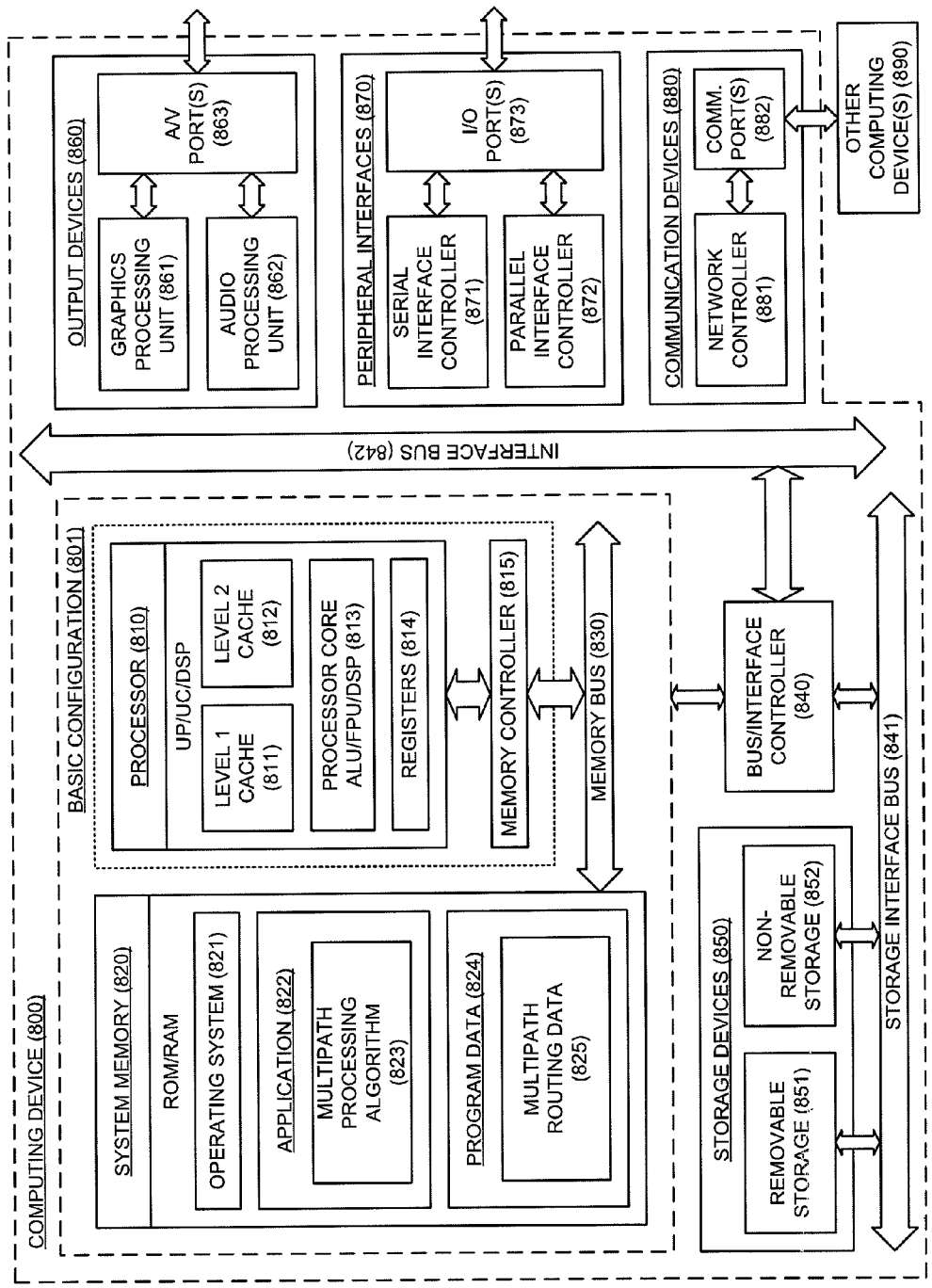
FIG. 8 is a block diagram illustrating another exemplary system upon which embodiments may be implemented.

FIG. 8 is a block diagram illustrating another exemplary system 800 upon which embodiments may be implemented. For example, verification module 142, CMM 138, client 100 with client ad manager 132 and client social manager 134, and ads server 118 may be implemented with system 800. In a very basic configuration 801, computing device 800 typically includes one or more processors 810 and system memory 820. A memory bus 830 can be used for communicating between the processor 810 and the system memory 820.

Depending on the desired configuration, processor 810 can be of any type including but not limited to a microprocessor (μP), a microcontroller (μC), a digital signal processor (DSP), or any combination thereof. Processor 810 can include one more levels of caching, such as a level one cache 811 and a level two cache 812, a processor core 813, and registers 814. The processor core 813 can include an arithmetic logic unit (ALU), a floating point unit (FPU), a digital signal processing core (DSP Core), or any combination thereof. A memory controller 815 can also be used with the processor 810, or in some implementations the memory controller 815 can be an internal part of the processor 810.

Depending on the desired configuration, the system memory 820 can be of any type including but not limited to volatile memory (such as RAM), non-volatile memory (such as ROM, flash memory, etc.) or any combination thereof. System memory 820 typically includes an operating system 821, one or more applications 822, and program data 824. Application 822 includes a dual intent local targeted advertising processing algorithm 823. Program Data 824 includes dual intent local targeted advertising data 825, as will be further described below. In some embodiments, application 822 can be arranged to operate with program data 824 on an operating system 821. This described basic configuration is illustrated in FIG. 8 by those components within dashed line 801.

Computing device 800 can have additional features or functionality, and additional interfaces to facilitate communications between the basic configuration 801 and any required devices and interfaces. For example, a bus/interface controller 840 can be used to facilitate communications between the basic configuration 801 and one or more data storage devices 850 via a storage interface bus 841. The data storage devices 850 can be removable storage devices 851, non-removable storage devices 852, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 820, removable storage 851 and non-removable storage 852 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of device 800.

Computing device 800 can also include an interface bus 842 for facilitating communication from various interface devices (e.g., output interfaces, peripheral interfaces, and communication interfaces) to the basic configuration 801 via the bus/interface controller 840. Example output devices 860 include a graphics processing unit 861 and an audio processing unit 862, which can be configured to communicate to various external devices such as a display or speakers via one or more A/V ports 863. Example peripheral interfaces 870 include a serial interface controller 871 or a parallel interface controller 872, which can be configured to communicate with external devices such as input devices (e.g., keyboard, mouse, pen, voice input device, touch input device, etc.) or other peripheral devices (e.g., printer, scanner, etc.) via one or more I/O ports 873. An example communication device 880 includes a network controller 881, which can be arranged to facilitate communications with one or more other computing devices 890 over a network communication via one or more communication ports 882. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 800 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Exemplary embodiments are shown and described in the present disclosure. It is to be understood that the embodiments are capable of use in various other combinations and environments and are capable of changes or modifications within the scope of the inventive concept as expressed herein. Some such variations may include using programs stored on non-transitory computer-readable media to enable computers and/or computer systems to carry our part or all of the method variations discussed above. Such variations are not to be regarded as departure from the spirit and scope of the invention, and all such modifications as would be obvious to one skilled in the art are intended to be included within the scope of the following claims:

The invention claimed is:

1. A method performed by a data processing apparatus, comprising:
    in response to receiving at a server from a client an indication that a user has interacted with a promotional content item, retrieving a personal cookie for the user, wherein an encrypted first data representing a user ID is included in said personal cookie, and said personal cookie is usable to obtain other cookies;
    decrypting said encrypted first data included in said personal cookie;
    extracting said user ID from said decrypted first data;
    verifying said user ID to be authentic;
    encrypting said user ID and including said encrypted user ID in a limited ID cookie, wherein said limited ID cookie is a cookie encrypted by said server, and said limited ID cookie is decryptable only by said server; and
    sending said limited ID cookie, including said encrypted user ID to said client.

2. The method of claim 1, wherein said user ID is verified by searching in a table for said user ID.

3. The method of claim 1, further comprising obtaining a user information by searching in a table for said user ID; and including said user information in said limited ID cookie.

4. The method of claim 1, wherein said limited ID cookie also includes user information indicating that use of said limited ID cookie for a particular purpose is permitted.

5. The method of claim 1, wherein said personal cookie further includes an encrypted second data representing a social networking login account.

6. An apparatus comprising:
one or more processors; and
a non-transient computer-readable medium coupled to said one or more processors, the computer-readable medium having instructions stored thereon that, when executed by said one or more processors, cause said one or more processors to perform operations comprising:
in response to receiving from a client an indication that a user has interacted with a promotional content item, retrieving a personal cookie for the user, wherein an encrypted first data representing a user ID is included in said personal cookie, and said personal cookie is usable to obtain other cookies;
decrypting said encrypted first data included in said personal cookie;
extracting said user ID from said decrypted first data;
verifying said user ID to be authentic;
encrypting said user ID and including said encrypted user ID in a limited ID cookie, wherein said limited ID cookie is a cookie encrypted by said one or more processors, and said limited ID cookie is decryptable only by said one or more processors; and
sending said limited ID cookie, including said encrypted user ID to said client.

7. The apparatus of claim 6, wherein said user ID is verified by searching in a table for said user ID.

8. The apparatus of claim 6, said operations further comprising:
obtaining user information by searching in a table for said user ID; and including said user information in said limited ID cookie.

9. The apparatus of claim 6, wherein said limited ID cookie also includes user information indicating that use of said limited ID cookie for a particular purpose is permitted.

10. The apparatus of claim 6, wherein said personal cookie further includes encrypted second data representing a social networking login account.

11. A system comprising:
one or more computers; and
a non-transient computer-readable medium coupled to the one or more computers, said computer-readable medium having instructions stored thereon which, when executed by the one or more computers, cause the one or more computers to perform operations comprising:
in response to receiving from a client an indication that a user has interacted with a promotional content item, retrieving a personal cookie for the user, wherein an encrypted first data representing a user ID is included in said personal cookie, and said personal cookie is usable to obtain other cookies;
decrypting said encrypted first data included in said personal cookie;
extracting said user ID from said decrypted first data;
verifying said user ID to be authentic;
encrypting said user ID and including said encrypted user ID in a limited ID cookie, wherein said limited ID cookie is a cookie encrypted by said one or more computers, and said limited ID cookie is decryptable only by said one or more computers; and
sending said limited ID cookie, including said encrypted user ID to said client.

12. The system of claim 11, wherein said user ID is verified by searching in a table for said user ID.

13. The system of claim 11, wherein said instructions stored on said computer-readable medium further comprises instructions for causing the one or more computers to perform operations comprising:
obtaining a user information by searching in a table for said user ID; and
including said user information in said limited ID cookie.

14. The system of claim 11, wherein said limited ID cookie also includes user information indicating that use of said limited ID cookie for a particular purpose is permitted.

15. The system of claim 11, wherein said personal cookie further includes encrypted second data representing a social networking login account.

16. A non-transient computer-readable medium encoded with a computer program comprising instructions that, when executed, operate to cause a computer to perform operations comprising:
in response to receiving from a client an indication that a user has interacted with a promotional content item, retrieving a personal cookie for the user, wherein an encrypted first data representing a user ID is included in said personal cookie, and said personal cookie is usable to obtain other cookies;
decrypting said encrypted first data included in said personal cookie;
extracting said user ID from said decrypted first data;
verifying said user ID to be authentic;
encrypting said user ID and including said encrypted user ID in a limited ID cookie, wherein said limited ID cookie is a cookie encrypted by a server, and said limited ID cookie is decryptable only by said server; and
sending said limited ID cookie, including said encrypted user ID to said client.

17. The computer-readable medium of claim 16, wherein said limited ID cookie also includes user information indicating that use of said limited ID cookie for a particular purpose is permitted.

18. The computer-readable medium of claim 16, wherein said limited ID cookie is also decryptable by said client.

19. A method performed by a data processing apparatus, comprising:
receiving, at a server, a token and a request for a limited ID cookie from a client executing an application that requires explicit permission to obtain a cookie containing a user ID,
extracting said user ID from said token;
encrypting said user ID and including said encrypted user ID in said limited ID cookie;
wherein said limited ID cookie is a cookie encrypted by said server, said limited ID cookie is decryptable only by said server, and data representing an encrypted form of said user ID is included in said limited ID cookie; and
sending said limited ID cookie with said encrypted form of said user ID to said client.

* * * * *